(12) United States Patent
Manabe

(10) Patent No.: US 9,906,740 B2
(45) Date of Patent: Feb. 27, 2018

(54) IMAGE PROCESSING APPARATUS, IMAGE PROCESSING METHOD, AND MEDIUM FOR NOISE REDUCTION

(71) Applicant: CANON KABUSHIKI KAISHA, Tokyo (JP)

(72) Inventor: Yoshihiro Manabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/271,423

(22) Filed: Sep. 21, 2016

(65) Prior Publication Data

US 2017/0099445 A1  Apr. 6, 2017

(30) Foreign Application Priority Data

Oct. 5, 2015 (JP) ................................. 2015-197720

(51) Int. Cl.
*H04N 5/357* (2011.01)
*H04N 9/64* (2006.01)
*H04N 1/409* (2006.01)

(52) U.S. Cl.
CPC ............. *H04N 5/357* (2013.01); *H04N 1/409* (2013.01); *H04N 9/646* (2013.01)

(58) Field of Classification Search
CPC ........ H04N 5/357; H04N 9/646; H04N 1/409; H04N 5/3575; H04N 5/2173; H04N 17/00; H04N 9/045; H04N 1/6027; G06T 5/001; G06T 5/002
See application file for complete search history.

(56) References Cited

U.S. PATENT DOCUMENTS

| 7,999,863 | B2 * | 8/2011 | Nakamura | ........... H04N 5/2351 348/223.1 |
| 2010/0245632 | A1 * | 9/2010 | Suzuki | ............... H04N 5/23212 348/241 |
| 2012/0206630 | A1 * | 8/2012 | Nguyen | ................. H04N 1/409 348/241 |

(Continued)

FOREIGN PATENT DOCUMENTS

JP  2012-231459 A  11/2012

*Primary Examiner* — Luong T Nguyen
(74) *Attorney, Agent, or Firm* — Carter, DeLuca, Farrell & Schmidt, LLP

(57) ABSTRACT

An object of the present invention is to provide an image processing apparatus capable of reducing noise in advance that occurs due to color adjustment. The present invention is an image processing apparatus having: a noise amount prediction unit configured to predict a noise amount based on RAW image data acquired by image capturing under fixed image capturing conditions, a color adjustment parameter and the image capturing conditions; an image capturing condition determination unit configured to determine image capturing conditions the contents of which have been changed based on the predicted noise amount; a noise reduction parameter determination unit configured to determine a noise reduction parameter; and a noise reduction unit configured to perform noise reduction processing in accordance with the noise reduction parameter for RAW image data acquired by image capturing under the image capturing conditions determined by the image capturing condition determination unit.

8 Claims, 5 Drawing Sheets

(56) References Cited

U.S. PATENT DOCUMENTS

2013/0242116 A1* 9/2013 Fujii .................... H04N 17/00
348/180
2015/0005575 A1* 1/2015 Kobayashi ......... A61B 1/00009
600/103

* cited by examiner

IMAGE PROCESSING APPARATUS, IMAGE PROCESSING METHOD, AND MEDIUM FOR NOISE REDUCTION

BACKGROUND OF THE INVENTION

Field of the Invention

The present invention relates to a technique of noise reduction processing for RAW image data acquired by using an image capturing apparatus.

Description of the Related Art

In recent years, at the photographing (filming) location of the cinema or the like, it is made possible to check an image after development in which the intention of a photographing director is reflected by giving parameters (hereinafter, color adjustment parameters) for various kinds of color adjustment to an output image signal of an image capturing apparatus. Further, it is made possible to transfer the parameters used at the photographing location to an editing apparatus used in the post-production as metadata along with RAW image data of a captured image and to reflect the parameters in development in the post-production. Due to this, it is possible to reproduce the color adjustment checked at the photographing location both quickly and exactly in the post-production, and therefore, the work efficiency of the post-production is improved.

There exist a variety of parameters for conveniently transferring information on the appearance of an image after the color adjustment as described above between work flows. For example, ASC-CDL (The American Society of Cinematographers Color Decision List, hereinafter, CDL) is information for color modification defined by the American Society of Cinematographers. In CDL, three parameters, i.e., offset, slope, and power (gamma), are defined for each of RGB, and thereby, it is made possible to change the gradation characteristics of RGB. It is possible for a photographer and a photographing director at a photographing location to check an image in which CDL is reflected by appropriately applying these parameters to an output image signal of the image capturing apparatus and by observing the image through a monitor.

There are photographing gamma, 3D-LUT, RRT (used in color adjustment processing in conformity with the ACES standard) as the above-described parameters other than CDL. As a technique to check a color at a photographing location, Japanese Patent Laid-Open No. 2012-231459 has disclosed the technique to perform color adjustment and color check at a photographing location by performing color conversion with parameters (IDT, RRT, ODT) used in the ACES color conversion processing for a video signal and producing a display on a monitor.

SUMMARY OF THE INVENTION

There is a case where noise is amplified and the image quality deteriorates depending on color conversion as the results of performing color conversion by applying parameters, such as CDL, 3D-LUT, and RRT, to a captured image. It is difficult to notice this deterioration in image quality at a photographing location where it is frequent to check an image by using a monitor the screen size of which is small, and in most cases, this deterioration in image quality is noticed in the post-production in which it is possible to check an image by using a monitor the screen size of which is large. In the case where the deterioration in image quality is noticed in the post-production, it is necessary to perform work to correct the deterioration in image quality, such as noise reduction processing, in addition to the originally required color adjustment work, and therefore, there is such a problem that the work efficiency is reduced.

The present invention is an image processing apparatus having: a noise amount prediction unit configured to predict a noise amount based on RAW image data acquired by image capturing under fixed image capturing conditions, color adjustment parameters, which are information on color adjustment, specified by a user, and the above-described image capturing conditions; an image capturing condition determination unit configured to determine image capturing conditions the contents of which have been changed based on the predicted noise amount; a noise reduction parameter determination unit configured to determine a noise reduction parameter indicating the degree of noise reduction processing based on the image capturing conditions determined by the image capturing condition determination unit and the predicted noise amount; and a noise reduction unit configured to perform noise reduction processing in accordance with the noise reduction parameter for the RAW image data acquired by image capturing under the image capturing conditions determined by the image capturing condition determination unit.

Further features of the present invention will become apparent from the following description of exemplary embodiments (with reference to the attached drawings).

DESCRIPTION OF THE EMBODIMENTS

First Embodiment

Hereinafter, embodiments of the present invention are explained with reference to the drawings.

<Configuration of Image Processing Apparatus>

Figure 1:
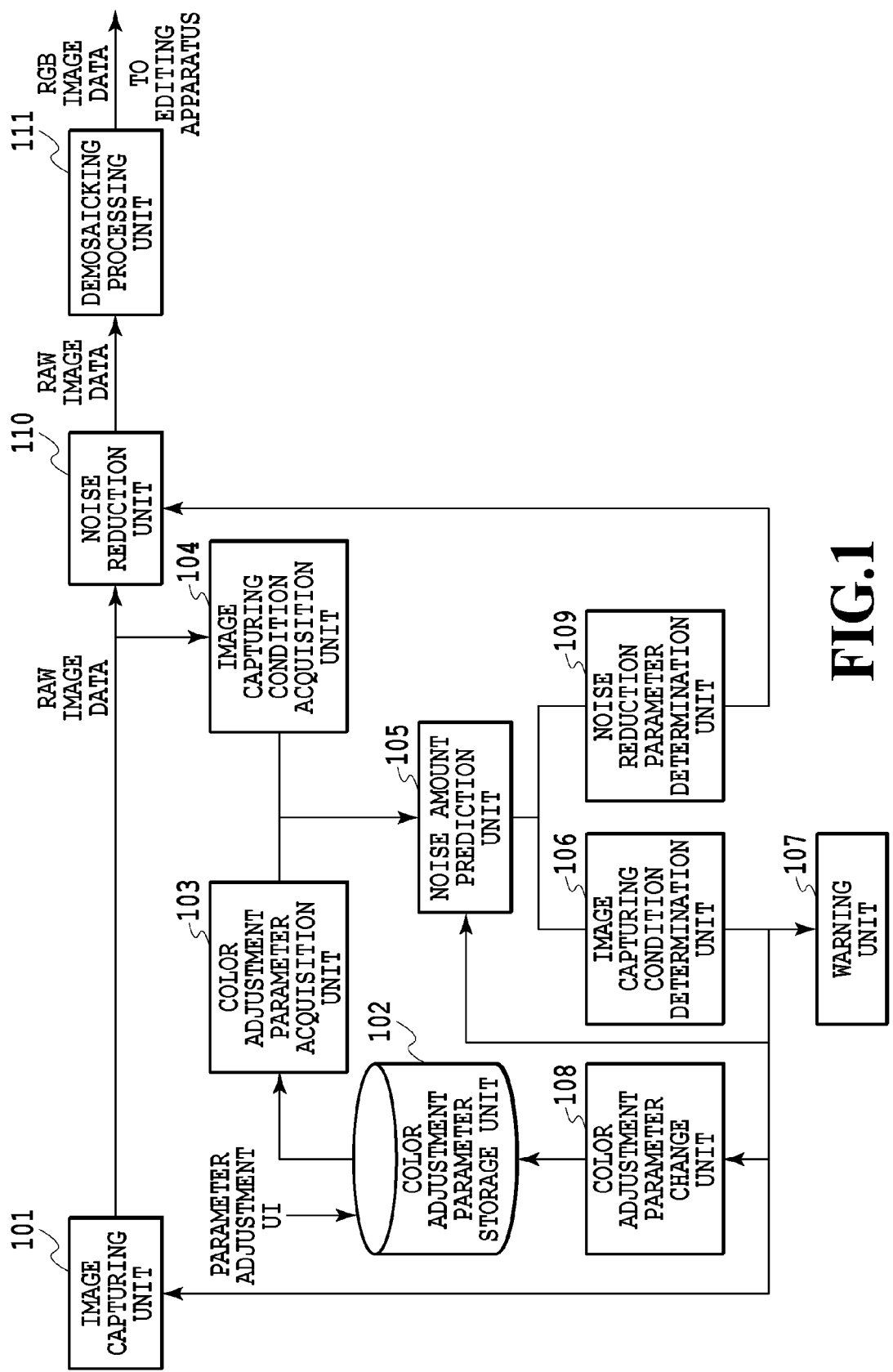
FIG. 1 is a block diagram showing a configuration of an image processing apparatus in a first embodiment.

FIG. 1 is a block diagram schematically showing a configuration example of an image processing apparatus in the present embodiment.

An image capturing unit 101 acquires a captured image (RAW image data) by capturing an image of a subject and outputs the captured image to an image capturing condition acquisition unit 104 and a noise reduction unit 110 in the subsequent stages. Further, the image capturing unit 101 also outputs image capturing conditions at the time of image capturing. The image capturing unit 101 is, for example, an image capturing element included in an image capturing unit, such as a digital camera and a digital video camera, or an image capturing unit itself, such as a digital camera and a digital video camera.

In a color adjustment parameter storage unit 102, color adjustment parameters (e.g., CDL, 3D-LUT, etc.) used at the time of performing color adjustment for a captured image are saved. Color adjustment parameters are input by a user (photographing director or the like) via a parameter adjustment UI. As the color adjustment parameter storage unit 102, for example, a memory, an HDD, etc., are used.

A color adjustment parameter acquisition unit 103 reads and acquires a color adjustment parameter saved in the color adjustment parameter storage unit 102.

The image capturing condition acquisition unit 104 acquires fixed image capturing conditions (shutter speed, f-stop, ISO speed) set in the image capturing unit 101 at the time of image capturing. It may also be possible to acquire the image capturing conditions from metadata that is output along with RAW image data, or to directly acquire from the image capturing unit 101 separately from RAW image data.

A noise amount prediction unit 105 predicts a noise amount after color adjustment based on a color adjustment parameter, RAW image data, and image capturing conditions.

An image capturing condition determination unit 106 determines appropriate image capturing conditions based on the results of the noise amount prediction unit 105 and outputs the determined image capturing conditions to the image capturing unit 101 and a color adjustment parameter change unit 108. In the image capturing unit 101 and the color adjustment parameter change unit 108 in the subsequent stages, setting is done again in accordance with the image capturing conditions.

A warning unit 107 is a unit configured to notify a user of a warning in the case where appropriate image capturing conditions are not obtained. As the warning unit 107, for example, an external monitor, a warning lamp, etc., are used.

The color adjustment parameter change unit 108 changes the color adjustment parameter in the case where setting is done again in accordance with the image capturing conditions determined by the image capturing condition determination unit 106. The color adjustment parameter change unit 108 calculates the color adjustment parameter corresponding to the image capturing conditions after the change so that the same color as the color obtained by a combination of the image capturing conditions before the change and the color adjustment parameter is obtained. The color adjustment parameter corresponding to the image capturing conditions after the change, which is calculated by the color adjustment parameter change unit 108, is sent to the color adjustment parameter storage unit 102 and saved therein.

A noise reduction parameter determination unit 109 determines a parameter (hereinafter, noise reduction parameter) indicating the degree of noise reduction processing performed for RAW image data based on the results of the noise amount prediction unit 105 and outputs the determined noise reduction parameter to the noise reduction unit 110 in the subsequent stage.

The noise reduction unit 110 performs noise reduction processing in accordance with the noise reduction parameter for RAW image data.

A demosaicking processing unit 111 performs demosaicking processing for RAW image data of the Bayer array. Due to this, RGB image data in which each pixel has RGB values is acquired and transferred to an editing apparatus in the subsequent stage. It may also be possible to use an arbitrary method as a demosaicking method.

Hereinafter, as to the image processing apparatus in the present embodiment, the operations of the noise amount prediction unit 105, the image capturing condition determination unit 106, the noise reduction parameter determination unit 109, and the noise reduction unit 110 are explained.

<Operation of Noise Amount Prediction Unit>

Figure 2:
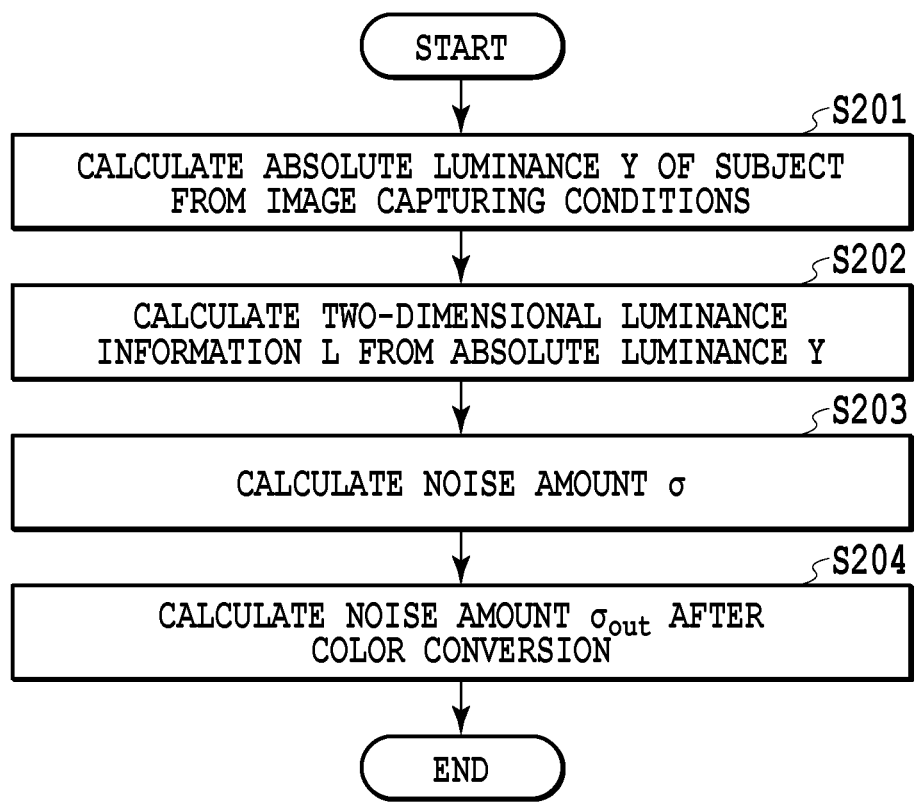
FIG. 2 is a flowchart showing an operation of a noise amount prediction unit 105 in the first embodiment.

The operation of the noise amount prediction unit 105 is explained by using a flowchart in FIG. 2. In the present embodiment, moving image photographing is supposed and luminance information for each pixel of an image in one frame at the time of moving image photographing is calculated and a noise amount is calculated based on the luminance information.

First, at step S201 (hereinafter, step S201 is abbreviated as S201 and other steps are also abbreviated similarly), based on expression (1) in conformity with the APEX standard, absolute luminance Y, which is luminance information on a subject, is obtained by using information on image capturing conditions, such as an f-stop, a shutter speed, and an ISO speed.

$$\log_2 \frac{Y}{3.42} = 2\log_2 F - \log_2 T - \log_2 \frac{S}{3.325} \qquad \text{expression (1)}$$

In expression (1), the absolute luminance Y is average luminance information ($cd/m^2$) on the whole of a photographed image, F is an f-stop, T is a shutter speed (s), and S is an ISO speed. Here, Y is the luminance corresponding to 18% in the case where the pixel values (values linear to the luminance of a subject, for which gamma conversion has not been performed) in the photographed image are normalized to a range of 0% to 100%. For example, in the case where F=2.8, T=1/500, and S=400, Y=464 $cd/m^2$ is obtained.

The derivation method of luminance information is not limited to the above-described method and in the case where, for example, a luminance meter for acquiring luminance information is mounted on a camera, it may also be possible to acquire luminance information with the luminance meter. Depending on a subject, there is a case where it is inappropriate to derive luminance information by using the image capturing conditions as shown by expression (1) described above (e.g., in the case where the whole of a photographed image is a black image or a white image or the like). In such a case, it is not possible to accurately derive luminance information by using expression (1) described above, and therefore, it is recommended to use a luminance meter.

Next, at S202, by using expression (2) below, the absolute luminance Y is converted into luminance information L for each pixel of the photographed image.

$$L(x, y, t) = \frac{100}{18} Y(t) * \frac{G(x, y, t)}{Gmax} \qquad \text{expression (2)}$$

In expression (2), L is a two-dimensional luminance distribution image in a certain frame t, G is an image of the G channel close to the spectral characteristics of luminance among RGB of the photographed image in the frame t, and Gmax is the maximum pixel value in the image of the G channel. It is assumed that the pixel value of G is a numerical value linear with the luminance of a subject. In the case where Y (t)=464 $cd/m^2$, Gmax=255, and G (1, 1, t)=200, L (1, 1, t) will be about 2,021.8 $cd/m^2$.

Next, at S203, by using the luminance information on the subject calculated at S202, a noise amount σ that occurs on an image is calculated. This calculation makes use of the fact that a total amount of light Q in the case where the luminance information L is obtained under the image capturing conditions that the shutter speed is T and the f-stop is F can be calculated by expression (3) below. For example, in the case where L (1, 1, t)=2,021.8, T=1/500, and F=2.8, Q (1, 1, t) will be about 0.516.

$$Q(x,y,t)=L(x,y,t)*T/F^2 \quad \text{expression (3)}$$

It is known that the noise amount is proportional to the square root of the amount of light received by a camera, and by using expression (4) below, the ratio σ of the noise amount to the signal value Q (two-dimensional distribution in the frame t) is obtained. It is assumed that k is a proportion constant and is an arbitrary coefficient. For example, based on the actually measured values, k is determined in advance so that the value of σ becomes the ratio of the noise amount to the signal value.

$$\sigma(x,y,t)=k\sqrt{Q(x,y,t)}Q(x,y,t) \quad \text{expression (4)}$$

For example, in the case where k=0.0718 and Q (1, 1, t)=0.516, σ (1, 1, t)=0.1 is obtained. This indicates that noise is included in a ratio of 0.1 for the original signal value. In the present embodiment, the noise amount σ is calculated from the amount of received light Q of the photographed image, but the derivation method of the noise amount is not limited to the above-described method. For example, it may also be possible to directly calculate the noise amount from RAW image data or to determine the noise amount by holding a table specifying a noise amount associated with image capturing conditions for each piece of the luminance information Y on the subject and by referring to this table.

Next, at S204, by using the noise amount σ calculated at S203 and the color adjustment parameter, the noise amount after color conversion is calculated. In the present embodiment, the amount of noise that occurs in color conversion by CDL is calculated by assuming that the color adjustment parameter is CDL. Here, the color conversion by CDL is expressed by expression (5) below.

$$\text{out}=(\text{in}\times\text{slope}+\text{offset})^{power} \quad \text{expression (5)}$$

In expression (5), out is the output pixel value, in is the input pixel value (value normalized to a range of 0 to 1), and slope, offset, and power are the parameters specified in CDL, and they are a slope, an offset, and power (gamma), respectively. At this time, a noise amount σ out after color conversion by CDL as shown in expression (5) is performed can be calculated as expressed in (6) below by using expression (5) and an error propagation rule.

$$\sigma_{out}(x, y, t) = \sqrt{\left(\frac{\partial out}{\partial in}\right)^2 \cdot \sigma(x, y, t)^2} = \text{power} \cdot$$
$$(in(x, y, t)\times\text{slope} + \text{offset})^{power-1} \cdot \text{slope} \cdot \sigma(x, y, t) \quad \text{expression (6)}$$

For example, in the case where in (1, 1, t)=0.78, slope=1.0, offset=0.055, power=2.2, and σ (1, 1, t)=0.1, σ out=0.177 is obtained. By comparing σ out (1, 1, t)=0.177 with σ (1, 1, t)=0.1 calculated at S203, it is known that noise has been amplified due to color conversion.

Even in the case where color conversion by a color adjustment parameter other than CDL, it is possible to calculate a noise amount after color conversion by using an error propagation rule. Further, as a method other than this, it may also be possible to calculate a noise amount by virtually performing color conversion for one frame of a photographed image.

<Operation of Image Capturing Condition Determination Unit>

Figure 3:
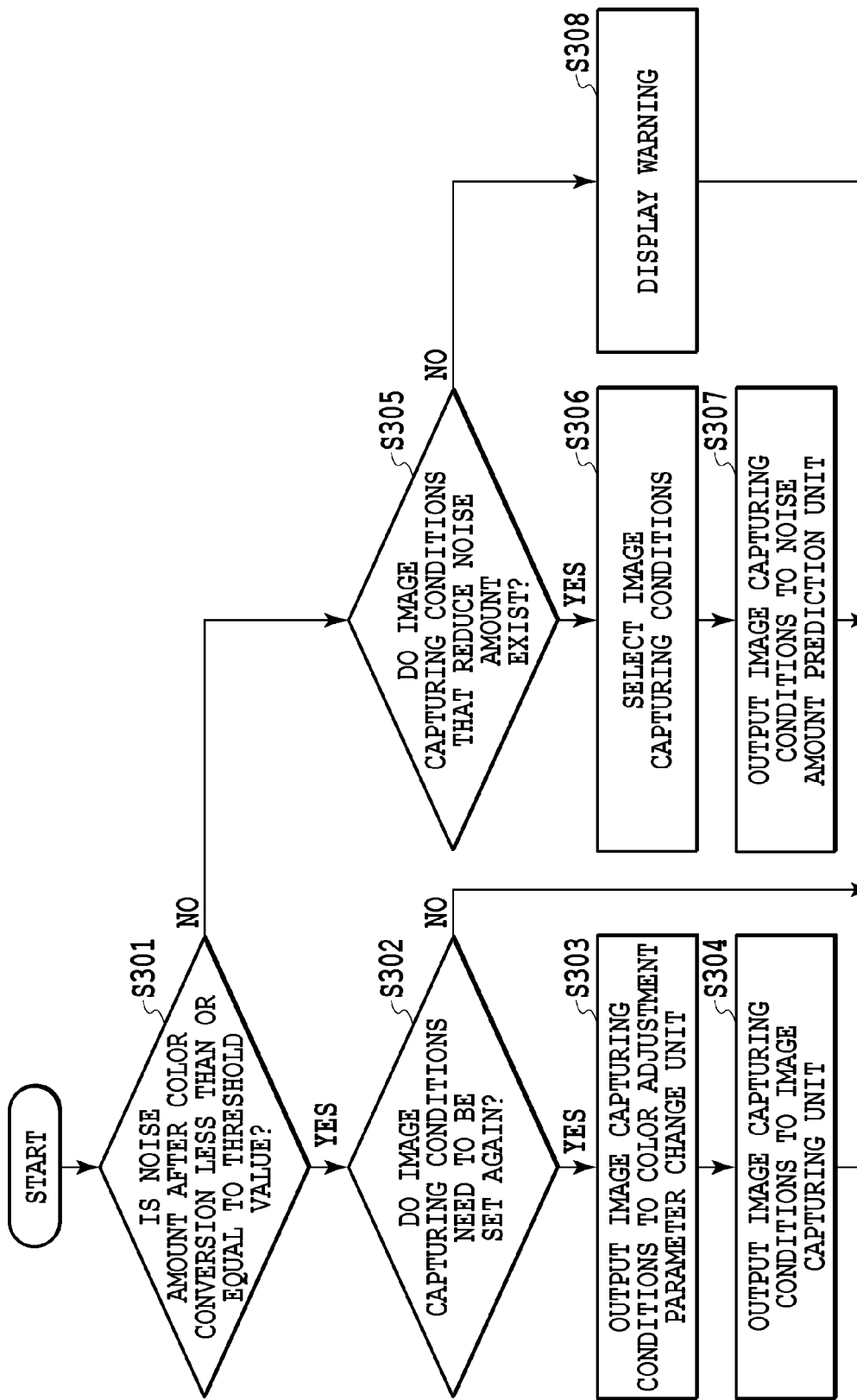
FIG. 3 is a flowchart showing an operation of an image capturing condition determination unit 106 in the first embodiment.

The operation of the image capturing condition determination unit 106 is explained by using FIG. 3.

First, at S301, whether or not the noise amount after color conversion calculated at S204 is less than or equal to a threshold value is determined. The threshold value used at this step is a value greater than or equal to 0, representing the ratio of the noise amount to the signal value, and may be a fixed value determined in advance, or a value that a user can specify arbitrarily. In general, in the case where the value of σ out in expression (6) exceeds 0.5, an image with a large amount of noise will result, and therefore, it is desirable to set the threshold value in a range not less than 0 and not more than 0.5. Further, the amount of noise that is felt differs among a dark part, a halftone part, and a bright part, and therefore, it may also be possible to provide a threshold value for each tone level. In the case where the results of the determination at S301 indicate that the noise amount after color conversion is less than or equal to the threshold value, the processing proceeds to S302. On the other hand, in the case where the noise amount after color conversion is greater than the threshold value, the processing proceeds to S305.

Hereinafter, the case is explained where it is determined that the noise amount after color conversion is less than or equal to the threshold value at S301.

In this case, at S302, whether or not it is necessary to change the image capturing conditions currently set on the camera by setting the image capturing conditions again is determined. Specifically, information indicating whether or not the processing at S307 has been performed is stored and in the case where the processing at S307 has been performed even once, it is determined that the image capturing conditions of the camera need to be set again. The information indicating whether or not the processing at S307 has been performed is deleted in the case where the color adjustment parameter is changed. In the case where the results of the determination at S302 indicate that the image capturing conditions need to be set again, the processing proceeds to S303. On the other hand, in the case where the image capturing conditions do not need to be set again, the processing is terminated.

At S303, the image capturing conditions are output to the color adjustment parameter change unit 108.

Next, at S304, the image capturing conditions to be set again are output to the image capturing unit 101. In accordance with the image capturing conditions, the image capturing unit 101 captures an image of a subject and acquires captured image data.

Subsequently, the case is explained where it is determined that the noise amount after color conversion is greater than the threshold value at S301.

In this case, at S305, whether or not there exist image capturing conditions that can reduce the noise amount is determined. Specifically, whether or not there exist image capturing conditions that reduce an EV (Exposure Value) value representing the brightness of exposure is determined. It is possible to calculate the EV value by using the f-stop and the shutter speed. In the case where the results of the determination at S305 indicate that there exist image capturing conditions that can reduce the noise amount, the processing proceeds to S306. On the other hand, in the case where image capturing conditions that can reduce the noise amount do not exist, the processing proceeds to S308 and a display to warn that an image of poor image quality will result due to a large amount of noise is produced by the warning unit 107 and the processing is terminated.

At S306, image capturing conditions that reduce the noise amount are selected. That is, image capturing conditions that reduce the EV value are selected by adjusting the shutter speed, the f-stop, and the ISO speed. In the case where there are restrictions on image capturing conditions because of the setting of the camera (fixed f-stop mode, fixed ISO speed mode, etc.), image capturing conditions are selected in accordance with the restrictions.

Next, at S307, the image capturing conditions are output to the noise amount prediction unit 105. In the noise amount prediction unit 105, the noise amount after color conversion for the newly selected image capturing conditions is predicted and the predicted noise amount is sent to the image capturing condition determination unit 106. Then, for the noise amount after color conversion, the series of processing shown in FIG. 3 is performed. For example, in the case where F is changed to 1.4 for the initial image capturing conditions that F=2.8, T=1/500, and S=400, the results of calculating expression (3) to expression (6) again will be 0.0886, and therefore, the noise amount is halved.

<Operation of Color Adjustment Parameter Change Unit>

The operation of the color adjustment parameter change unit 108 is explained. In the case where appropriate image capturing conditions are determined newly by the image capturing condition determination unit 106 described previously, the application of the color adjustment parameter applied to an image captured under the image capturing conditions before the change to an image captured under the image capturing conditions after the change will not produce the same color. Consequently, it becomes also necessary to change the color adjustment parameter in order to make the color the same before and after the change of the image capturing conditions. The color adjustment parameter change unit 108 stores the image capturing conditions before and after the change (i.e., each value of the f-stop, the shutter speed, and the ISO speed before and after the change) and calculates a change in the exposure light amount by calculating the EV value under the image capturing conditions before and after the change by using these values. Then, from the change in the exposure light amount, a difference in the pixel value between the captured images before and after the change of image capturing conditions is calculated as a gain amount gain. For example, in the case where the change in the EV value is −1, the gain of the pixel value in the captured image after the change is twice that before the change. In the case where the color adjustment parameter in the color conversion by CDL as shown in expression (5) described above is changed, slope corresponding to the gain of the pixel value is changed as follows.

$$\text{slope}' = \text{slope}/\text{gain} \quad \text{expression (7)}$$

Due to this, it is possible to make the image after conversion have the same color before and after the change of image capturing conditions. Even in the case of color conversion other than the color conversion by CDL, for example, in the case of color conversion by a matrix, it is possible to obtain the same color in images before and after the color adjustment parameter is changed by making adjustment of a coefficient based on the amount of change in the pixel value before and after the change of the image capturing conditions.

<Operation of Noise Reduction Parameter Determination Unit>

The operation of the noise reduction parameter determination unit 109 is explained. In the present embodiment, a noise reduction parameter (taken to be P) is set as shown in expression (8) below.

$$P(x,y,t) = p \times \sigma_{out}(x,y,t) \quad \text{expression (8)}$$

In expression (8), p is an arbitrary coefficient.

<Operation of Noise Reduction Unit>

The operation of the noise reduction unit 110 is explained. In the noise reduction processing in the present embodiment, noise is reduced by multiplying each of the pixel values of a plurality of reference pixels present on the periphery of a pixel of interest the noise of which is to be reduced, including the pixel of interest, by an adaptive weight, and by replacing the pixel value of the pixel of interest with the results of adding all the results.

The number of reference pixels is taken to be $N_s$ (number of pixels in a range of x=x1 to x2 and y=y1 to y2 within the frame t. Here, x1, x2, y1, and y2 are arbitrary coordinates), the pixel value of the reference pixel is taken to be $I_j$ (j=1 to $N_s$), and the weight of the reference pixel is taken to be $w_j$ (j=1 to $N_s$). Then, a pixel value $I_{new}$ of the pixel of interest after noise reduction processing can be expressed as expression (9) below.

$$I_{new} = \frac{\sum_{j=1}^{N_s} w_j \times I_j}{\sum_{j=1}^{N_s} w_j} \quad \text{expression (9)}$$

Here, the weight w can be determined by expression (10) below.

$$w_j = \exp\left(-\frac{c_j}{p^2}\right) \quad \text{expression (10)}$$

In expression (10), $C_j$ is similarity to an adjacent area and it is possible to calculate the similarity from, for example, a difference in the pixel value between the pixel of interest and the peripheral pixel. In the case where it is possible to determine the weight $w_j$ to be heavier for the lower similarity $C_j$ and to be lighter for the higher similarity $C_j$, it may be possible to calculate the weight by using any expression other than expression (10). P in expression (10) is the value calculated in expression (8). In expression (10), the weight $w_j$ becomes heavier for larger P, i.e., the larger noise amount $\sigma_{out}$ after color conversion, and therefore, the noise reduction effect becomes greater for a larger predicted noise amount.

As above, according to the present embodiment, by predicting the amount of noise that occurs after image processing using a color adjustment parameter specified by a user at the time of image capturing, the image capturing conditions are changed to more optimum ones. Then, the color adjustment parameter is also changed in accordance with the change in the image capturing conditions, a noise reduction parameter in accordance with the color adjustment parameter after the change is found, and the intensity of the noise reduction processing is adjusted. Due to this, it is made possible to suppress the amplification of the amount of noise that occurs in color adjustment in the stage of the process before the post-production. The image processing apparatus of the present embodiment may be provided to the camera main body, or may be provided to a display system for briefly checking an image after color adjustment at a photographing location.

Second Embodiment

In the first embodiment, the amount of noise that occurs after color conversion is predicted from the luminance information on a subject and the color adjustment parameter. In the present embodiment, the image processing apparatus further includes a display monitor characteristics acquisition unit and the amount of noise observed through a monitor on which a captured image is displayed is predicted and optimum image capturing conditions and a noise reduction parameter are determined. In the following explanation, explanation of the contents in common to those of the first embodiment is simplified or omitted.

<Configuration of Image Processing Apparatus>

Figure 4:
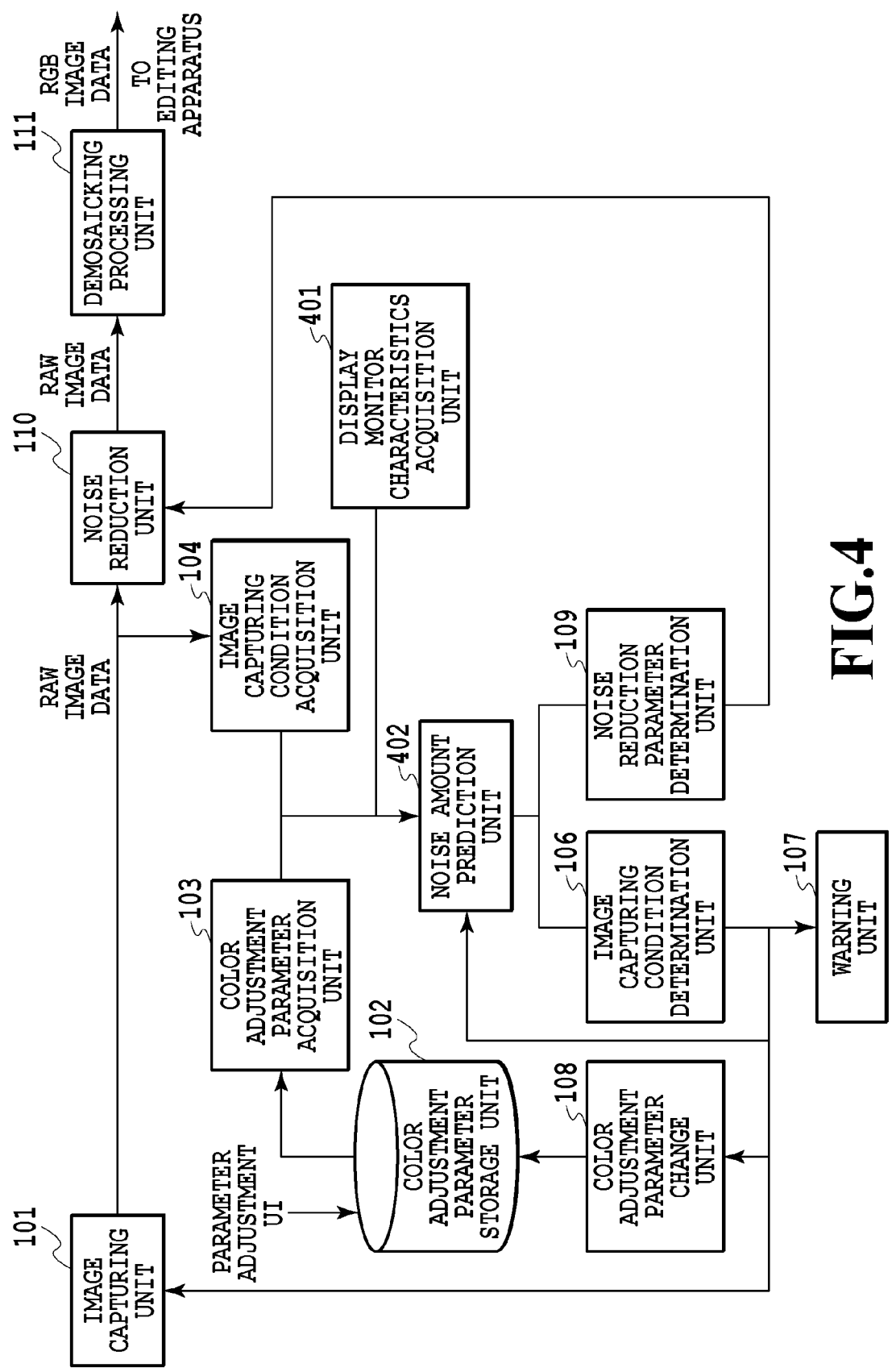
FIG. 4 is a block diagram showing a configuration of an image processing apparatus in a second embodiment.

FIG. 4 is a block diagram schematically showing a configuration example of the image processing apparatus in the present embodiment.

In the present embodiment, the image processing apparatus includes a display monitor characteristics acquisition unit 401 and the present embodiment differs from the first embodiment in this point (see FIG. 1). The display monitor characteristics acquisition unit 401 acquires and stores color characteristics of a display monitor (specifically, color gamut information, such as sRGB, AdobeRGB, and DCI). The color characteristics are sent to a noise amount prediction unit 402. Then, the noise amount prediction unit 402 predicts the noise amount based on the color characteristics of a display monitor, in addition to the RAW image data, the image capturing conditions, and the color adjustment parameter.

<Operation of Noise Amount Prediction Unit>

Figure 5:
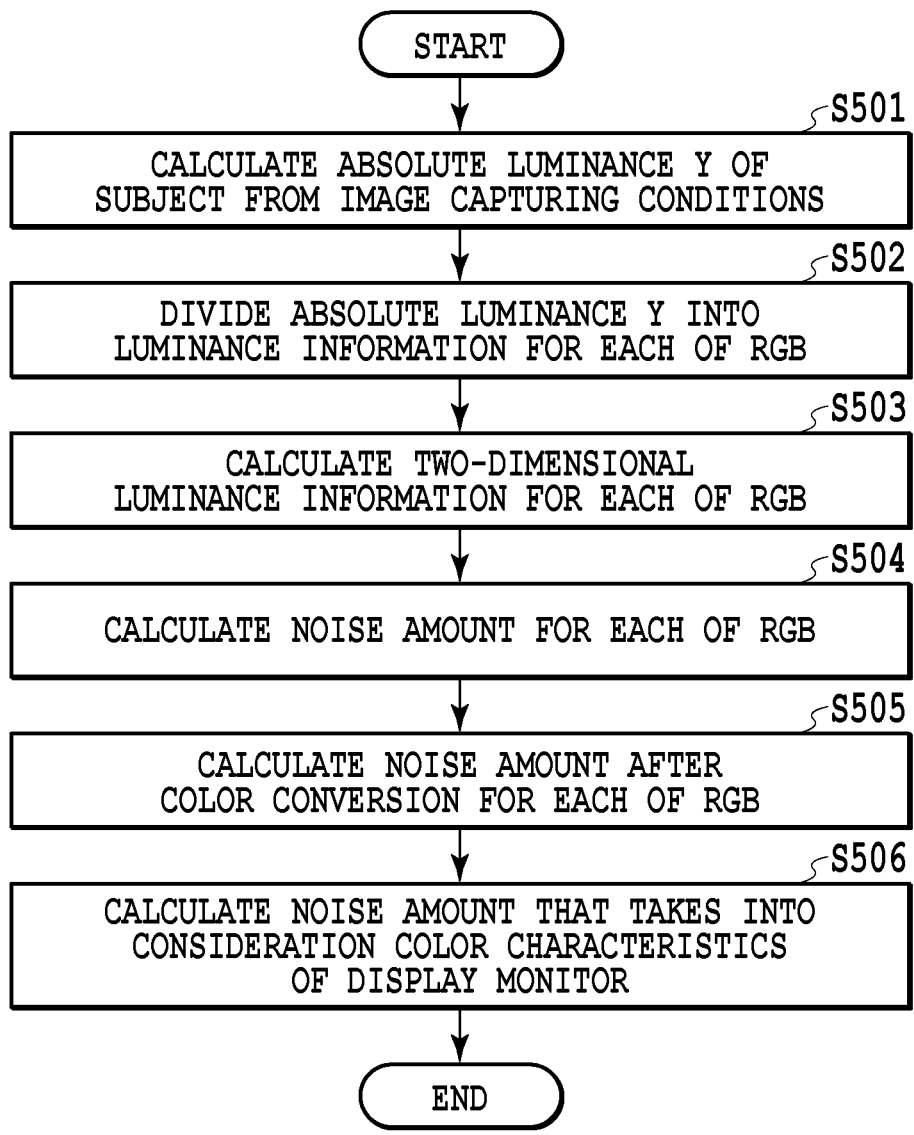
FIG. 5 is a flowchart showing an operation of a noise amount prediction unit 402 in the second embodiment.

The operation of the noise amount prediction unit 402 in the present embodiment is explained by using the flowchart in FIG. 5.

First, at S501, as at S201 of the first embodiment, the luminance information Y on a subject is calculated by using expression (1) in conformity with the APEX standard.

Next, at S502, in order to calculate the noise amount for each of RGB, the luminance information Y is divided into luminance information for each of RGB in accordance with a predetermined ratio as shown in expression (11) below.

$$Y(t)_R = m_R Y(t)$$

$$Y(t)_G = m_G Y(t)$$

$$Y(t)_B = m_B Y(t) \quad \text{expression (11)}$$

For example, in the case where a captured image that is used is an image signal based on the BT 709 standard, the luminance distribution ratio $m_R:m_G:m_B$ is about 0.2:0.7:0.1.

Next, at S503, by using expression (12) below, two-dimensional luminance distribution information is calculated for each of RGB.

$$L(x, y, t)_R = \frac{100}{18} Y(t)_R * \frac{R(x, y, t)}{Rmax}$$

$$L(x, y, t)_G = \frac{100}{18} Y(t)_G * \frac{G(x, y, t)}{Gmax}$$

$$L(x, y, t)_B = \frac{100}{18} Y(t)_B * \frac{B(x, y, t)}{Bmax} \quad \text{expression (12)}$$

In expression (12), R is an image in the R channel in the frame t, Rmax is the maximum pixel value in the image in the R channel, B is an image in the B channel in the frame t and Bmax is the maximum pixel value in the image in the B channel.

Next, at S504, by using expression (13) below, the noise amount for each of RGB is calculated. Here, as in expression (3) of the first embodiment, the noise amount is calculated for each of RGB by making use of the fact that it is possible to calculate, for each of RGB, the total amount of light Q in the case where the luminance distribution information L is obtained under the image capturing conditions of the shutter speed T and the f-stop F.

$$\sigma(x,y,t)_R = k_R * \sqrt{Q(x,y,t)_R} / Q(x,y,t)_R$$

$$\sigma(x,y,t)_G = k_G * \sqrt{Q(x,y,t)_G} / Q(x,y,t)_G$$

$$\sigma(x,y,t)_B = k_B * \sqrt{Q(x,y,t)_B} / Q(x,y,t)_B \quad \text{expression (13)}$$

Next, at S505, as in expression (6) of the first embodiment, the noise amount (taken to be $\sigma_{R\_out}, \sigma_{G\_out}, \sigma_{B\_out}$) after color conversion is performed is calculated for each of RGB by using expression (13) and the error propagation rule.

Next, at S506, by using the color characteristics of a display monitor, the noise amounts $\sigma_{R\_out}, \sigma_{G\_out}, \sigma_{B\_out}$ of RGB are converted into noise amounts $\sigma_X, \sigma_Y, \sigma_Z$ of tri-stimulus values XYZ on the monitor, respectively. In the case where the color gamut of the monitor is sRGB, as the color characteristics information, a conversion coefficient M from RGB into XYZ as shown in expression (14) below is acquired.

$$M = \begin{pmatrix} 0.412391 & 0.357584 & 0.180481 \\ 0.212639 & 0.715169 & 0.072192 \\ 0.019331 & 0.119195 & 0.950532 \end{pmatrix} \quad \text{expression (14)}$$

The, by using the conversion coefficient M, in accordance with expression (15) below, the noise amounts $\sigma_{R\_out}, \sigma_{G\_out}, \sigma_{B\_out}$ of RGB are converted into the noise amounts in the tri-stimulus values XYZ on the display monitor, respectively.

$$A = M \begin{pmatrix} \sigma^2_{R\_out} & 0 & 0 \\ 0 & \sigma^2_{G\_out} & 0 \\ 0 & 0 & \sigma^2_{B\_out} \end{pmatrix} M^{-1} \quad \text{expression (15)}$$

Here, as shown in expression (16), the diagonal components of a matrix A correspond to the noise amounts in the XYZ values.

$$A = \begin{pmatrix} \sigma^2_X & \sigma_{XY} & \sigma_{XZ} \\ \sigma_{YX} & \sigma^2_Y & \sigma_{YZ} \\ \sigma_{ZX} & \sigma_{ZY} & \sigma^2_Z \end{pmatrix} \quad \text{expression (16)}$$

Consequently, a noise amount $\sigma_{monitor}$ that is displayed on the monitor is calculated as expression (17) below.

$$\sigma_{monitor} = \sqrt{\sigma_X^2 + \sigma_Y^2 + \sigma_Z^2} \quad \text{expression (17)}$$

The above is the operation of the noise amount prediction unit 402 in the present embodiment. After this, as in the first embodiment, by using the noise amount $\sigma_{monitor}$ that is displayed on the monitor, the image capturing conditions are determined and the noise reduction parameter is determined.

As above, according to the present embodiment, by taking into consideration the color characteristics of the display monitor (gamma characteristics, color gamut information, etc.), the image capturing conditions and the noise reduction parameter are changed so that the amount of noise perceived through the display monitor is reduced. Due to this, it is made possible to suppress deterioration in image quality in the case where an image after color conversion is observed on the display monitor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the present invention, in accordance with the color adjustment parameter, such as CDL, determined at a photographing location, the image capturing conditions are changed and the parameter relating to noise reduction is adjusted. Due to this, it is made possible to reduce noise in advance that occurs due to color adjustment, and therefore, it is possible to reduce the workload in the process, such as the post-production after the photographing process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-197720, filed Oct. 5, 2015, which is hereby incorporated by reference wherein in its entirety.

What is claimed is:

1. An image processing apparatus comprising:
a processor; and
a memory coupled to the processor, the memory storing instructions which, when executed by the processor, cause the image processing apparatus to:
predict a noise amount based on RAW image data acquired by image capturing under fixed image capturing conditions, a color adjustment parameter, which is information on color adjustment specified by a user, and the fixed image capturing conditions;
determine changed image capturing conditions, the contents of which were changed from the fixed image capturing conditions based on the predicted noise amount;
determine a noise reduction parameter indicating a degree of noise reduction processing based on the changed image capturing conditions and the predicted noise amount; and
perform noise reduction processing in accordance with the noise reduction parameter for second RAW image data acquired by image capturing under the changed image capturing conditions.

2. The image processing apparatus according to claim 1, wherein
the contents of the fixed image capturing conditions and the changed image capturing conditions include an f-stop, a shutter speed, and an ISO speed, and
the memory further stores instructions which, when executed by the processor, cause the image processing apparatus to, in a case where the predicted noise amount is larger than a predetermined threshold value, select image capturing conditions that reduce an EV (exposure value) value representing brightness of exposure calculated by using the f-stop and the shutter speed.

3. The image processing apparatus according to claim 1, wherein the memory further stores instructions which, when executed by the processor, cause the image processing apparatus to:
change a color adjustment parameter based on the changed image capturing conditions,
predict a noise amount based on the changed image capturing conditions, the second RAW image data acquired by image capturing under the changed image capturing conditions, and the changed color adjustment parameter, and
determine the noise reduction parameter based on the predicted noise amount.

4. The image processing apparatus according to claim 3, wherein the memory further stores instructions which, when executed by the processor, cause the image processing apparatus to:
determine a color adjustment parameter in accordance with the changed image capturing conditions so that the same color output by a combination of the fixed image capturing conditions and the color adjustment parameter is output.

5. The image processing apparatus according to claim 1, wherein the memory further stores instructions which, when executed by the processor, cause the image processing apparatus to:
acquire color characteristics of a display monitor,
predict a noise amount based on the color characteristics of the display monitor.

6. The image processing apparatus according to claim 1, wherein the memory further stores instructions which, when executed by the processor, cause the image processing apparatus to:
warn a user in a case where the image processing apparatus cannot determine the changed image capturing conditions.

7. An image processing method comprising:
predicting a noise amount based on RAW image data acquired by image capturing under fixed image capturing conditions, a color adjustment parameter, which is information on color adjustment specified by a user, and the fixed image capturing conditions;
determining changed image capturing conditions, the contents of which were changed from the fixed image capturing conditions based on the predicted noise amount;

determining a noise reduction parameter indicating a degree of noise reduction processing based on the changed image capturing conditions and the predicted noise amount; and performing noise reduction processing in accordance with the noise reduction parameter for second RAW image data acquired by image capturing under the changed image capturing conditions.

8. A non-transitory computer readable storage medium storing a program causing a computer to perform an image processing method comprising the steps of:

predicting a noise amount based on RAW image data acquired by image capturing under fixed image capturing conditions, a color adjustment parameter, which is information on color adjustment specified by a user, and the fixed image capturing conditions;

determining changed image capturing conditions, the contents of which were changed from the fixed image capturing conditions based on the predicted noise amount;

determining a noise reduction parameter indicating a degree of noise reduction processing based on the changed image capturing conditions and the predicted noise amount; and performing noise reduction processing in accordance with the noise reduction parameter for second RAW image data acquired by image capturing under the changed image capturing conditions.

* * * * *